US012628056B2

(12) United States Patent
Yuan et al.

(10) Patent No.: US 12,628,056 B2
(45) Date of Patent: May 12, 2026

(54) NEEDFORGAP CAPABILITY SIGNALING IN NEW RADIO

(71) Applicant: Nokia Technologies Oy, Espoo (FI)

(72) Inventors: Ping Yuan, Beijing (CN); Tero Henttonen, Espoo (FI); Lars Dalsgaard, Oulu (FI); Jing He, Beijing (CN); Amaanat Ali, Espoo (FI)

(73) Assignee: Nokia Technologies Oy, Espoo (FI)

( * ) Notice: Subject to any disclaimer, the term of this patent is extended or adjusted under 35 U.S.C. 154(b) by 353 days.

(21) Appl. No.: 17/773,096

(22) PCT Filed: Nov. 7, 2019

(86) PCT No.: PCT/CN2019/116414
§ 371 (c)(1),
(2) Date: Apr. 29, 2022

(87) PCT Pub. No.: WO2021/087920
PCT Pub. Date: May 14, 2021

(65) Prior Publication Data
US 2022/0386199 A1     Dec. 1, 2022

(51) Int. Cl.
*H04W 36/06*     (2009.01)
*H04W 8/24*     (2009.01)
*H04W 36/00*     (2009.01)

(52) U.S. Cl.
CPC ............. *H04W 36/06* (2013.01); *H04W 8/24* (2013.01); *H04W 36/0088* (2013.01)

(58) Field of Classification Search
CPC .... H04W 36/06; H04W 8/24; H04W 36/0088
See application file for complete search history.

(56) References Cited

U.S. PATENT DOCUMENTS

| | | | |
|---|---|---|---|
| 2012/0178465 A1 | 7/2012 | Lin et al. | |
| 2018/0098253 A1 | 4/2018 | Huang et al. | |
| 2020/0296612 A1* | 9/2020 | Ma .......................... | H04L 5/001 |

FOREIGN PATENT DOCUMENTS

| | | |
|---|---|---|
| CN | 102714816 A | 10/2012 |
| CN | 106851721 A | 6/2017 |
| CN | 109413671 A | 3/2019 |
| CN | 109788497 A | 5/2019 |
| EP | 3641394 A1 | 4/2020 |
| WO | 2015/170284 A2 | 11/2015 |

(Continued)

OTHER PUBLICATIONS

"Report of 3GPP TSG RAN2#107 meeting", 3GPP TSG-RAN WG2 meeting #107bis, R2-1912001, Agenda: 2.2, ETSI MCC, Aug. 26-30, 2019, pp. 1-317.

(Continued)

*Primary Examiner* — Khoa Huynh
(74) *Attorney, Agent, or Firm* — Barta Jones, PLLC

(57)     ABSTRACT

In accordance with some embodiments, a method comprises receiving, by a network node, a first level capability about measurement gap needed or not for a user equipment. The method further comprises transmitting, by the network node, a pre-configured measurement gap pattern, in response to the reported first level capability indicates that the user equipment needs a measurement gap. The method further comprises receiving, by the network node, status of the pre-configured measurement gap pattern is changed by the user equipment.

20 Claims, 5 Drawing Sheets

(56) References Cited

FOREIGN PATENT DOCUMENTS

WO     2016/182526 A1    11/2016
WO     2018/228473 A1    12/2018

OTHER PUBLICATIONS

"Report of [107#81][NR TEI16] Need-for-Gaps signalling", 3GPP TSG-RAN WG2 Meeting #107bis, R2-1913847, Agenda: 11.20.1, MediaTek Inc, Oct. 14-18, 2019, 10 pages.
"3rd Generation Partnership Project; Technical Specification Group Radio Access Network; NR; Medium Access Control (MAC) protocol specification (Release 15)", 3GPP TS 38.321, V15.7.0, Sep. 2019, pp. 1-78.
"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.
International Search Report and Written Opinion received for corresponding Patent Cooperation Treaty Application No. PCT/CN2019/116414, dated Jul. 29, 2020, 10 pages.
"Measurement gap capability information for NR SA", 3GPP TSG-RAN WG2 Meeting #101, R2-1802978, Agenda: 10.4.1.4.3, Intel Corporation, Feb. 26-Mar. 2, 2018, pp. 1-8.
Office action received for corresponding European Patent Application No. 19951768.1, dated Sep. 11, 2025, 6 pages.
Office action received for corresponding Chinese Patent Application No. 201980101983.9, dated May 27, 2023, 12 pages.
Extended European Search Report received for corresponding European Patent Application No. 19951768.1, dated Jun. 20, 2023, 23 pages.
"Discussion on NeedForGap capability support in Release 16", 3GPP TSG-RAN WG2 Meeting #106, R2-1911313, Agenda: 11.20.1, Nokia, Aug. 26-30, 2019, 4 pages.
"Discussion on measurement gap capability", 3GPP TSG-RAN WG2 #107, R2-1909140, Agenda: 11.20.1, MediaTek Inc, Aug. 26-30, 2019, 2 pages.
"Discussion on NeedForGap signalling in NR SA before NE-DC or NR-DC configuration", 3GPP TSG-RAN WG2 Meeting #108, R2-1916193, Agenda: 6.20.1, Nokia, Nov. 18-22, 2019, 5 pages.
Office action received for corresponding Chinese Patent Application No. 201980101983.9, dated Feb. 23, 2024, 13 pages.

* cited by examiner

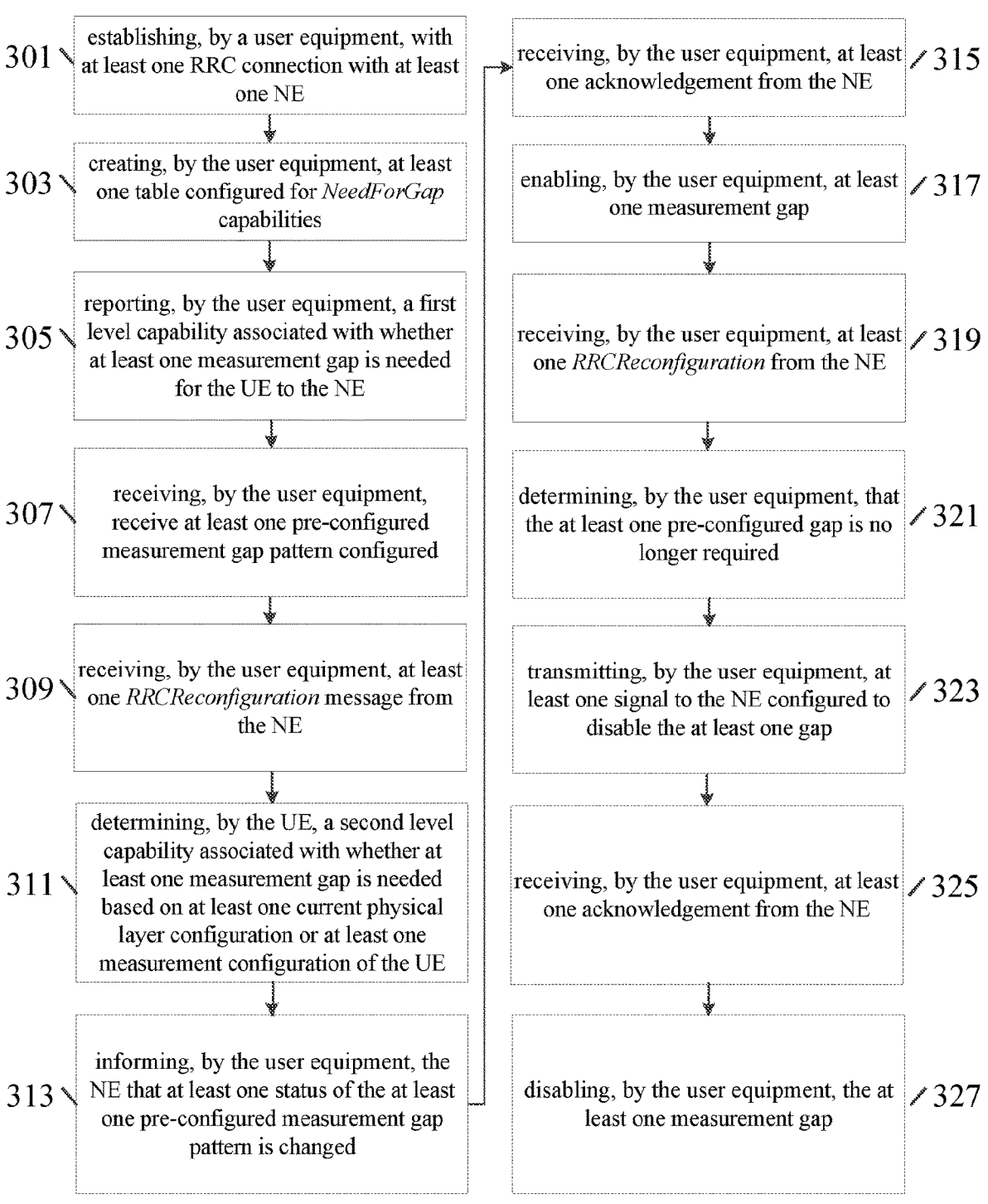

301 — establishing, by a user equipment, with at least one RRC connection with at least one NE 303 — creating, by the user equipment, at least one table configured for *NeedForGap* capabilities 305 — reporting, by the user equipment, a first level capability associated with whether at least one measurement gap is needed for the UE to the NE 307 — receiving, by the user equipment, receive at least one pre-configured measurement gap pattern configured 309 — receiving, by the user equipment, at least one *RRCReconfiguration* message from the NE 311 — determining, by the UE, a second level capability associated with whether at least one measurement gap is needed based on at least one current physical layer configuration or at least one measurement configuration of the UE 313 — informing, by the user equipment, the NE that at least one status of the at least one pre-configured measurement gap pattern is changed 315 — receiving, by the user equipment, at least one acknowledgement from the NE 317 — enabling, by the user equipment, at least one measurement gap 319 — receiving, by the user equipment, at least one *RRCReconfiguration* from the NE 321 — determining, by the user equipment, that the at least one pre-configured gap is no longer required 323 — transmitting, by the user equipment, at least one signal to the NE configured to disable the at least one gap 325 — receiving, by the user equipment, at least one acknowledgement from the NE 327 — disabling, by the user equipment, the at least one measurement gap

FIG. 3

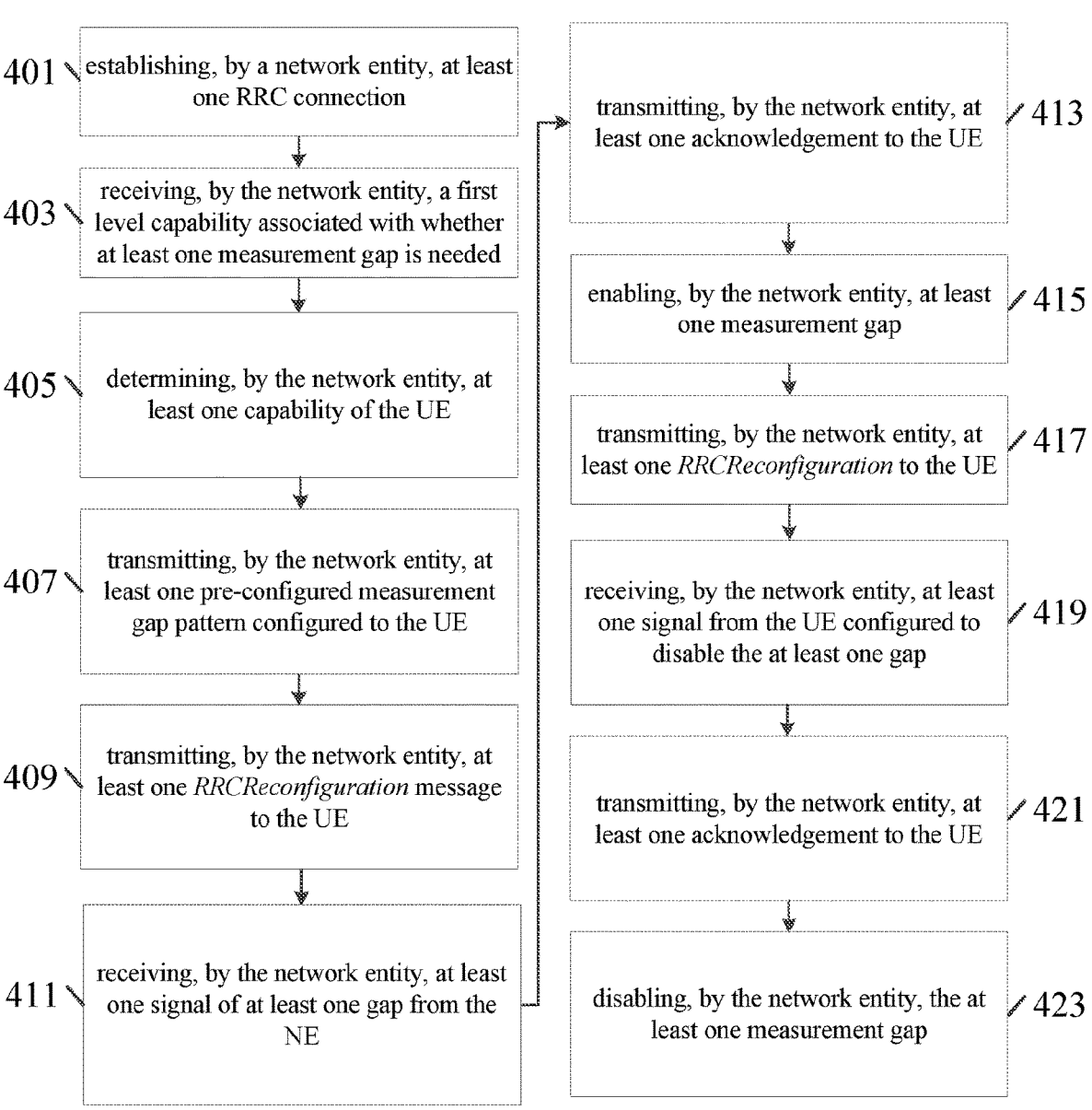

401 — establishing, by a network entity, at least one RRC connection

403 — receiving, by the network entity, a first level capability associated with whether at least one measurement gap is needed 405 — determining, by the network entity, at least one capability of the UE 407 — transmitting, by the network entity, at least one pre-configured measurement gap pattern configured to the UE 409 — transmitting, by the network entity, at least one *RRCReconfiguration* message to the UE 411 — receiving, by the network entity, at least one signal of at least one gap from the NE 413 — transmitting, by the network entity, at least one acknowledgement to the UE 415 — enabling, by the network entity, at least one measurement gap 417 — transmitting, by the network entity, at least one *RRCReconfiguration* to the UE 419 — receiving, by the network entity, at least one signal from the UE configured to disable the at least one gap 421 — transmitting, by the network entity, at least one acknowledgement to the UE 423 — disabling, by the network entity, the at least one measurement gap

FIG. 4

NEEDFORGAP CAPABILITY SIGNALING IN NEW RADIO

RELATED APPLICATION

This application was originally filed as PCT Application No. PCT/CN2019/116414, filed on Nov. 7, 2019 which is incorporated herein by reference in its entirety.

BACKGROUND

Field

Certain embodiments may relate to communication systems. For example, some embodiments may relate to measurement gaps.

Description of the Related Art

In 3rd Generation Partnership Project (3GPP) RAN2 #107, RAN2 decided to introduce a NeedForGap capability signalling in NR Rel-16 (R2-1912001) for improving the data transmission efficiency. The network may configure a measurement gap for the UE only when the UE has reported NeedForGap=true; otherwise, no measurement gap may be configured to the UE.

SUMMARY

In accordance with some embodiments, a method may include reporting, by a user equipment, a first level capability associated with whether at least one measurement gap is needed for the user equipment. The method may further include receiving, by the user equipment, at least one pre-configured measurement gap pattern configured by a network node. The method may further include determining, by the user equipment, a second level capability associated with whether at least one measurement gap is needed based on at least one of at least one current physical layer configuration or at least one measurement configuration of the user equipment. The method may further include determining, by the user equipment, when to enable or disable the at least one pre-configured measurement gap pattern based on the second level capability of the user equipment. The method may further include informing, by the user equipment, the network node that at least one status of the at least one pre-configured measurement gap pattern is changed.

In accordance with some embodiments, an apparatus may include means for reporting a first level capability associated with whether at least one measurement gap is needed for the apparatus. The apparatus may further include means for receiving at least one pre-configured measurement gap pattern configured by a network node. The apparatus may further include means for determining a second level capability associated with whether at least one measurement gap is needed based on at least one of at least one current physical layer configuration or at least one measurement configuration of the apparatus. The apparatus may further include means for determining when to enable or disable the at least one pre-configured measurement gap pattern based on the second level capability of the apparatus. The apparatus may further include means for informing the network node that at least one status of the at least one pre-configured measurement gap pattern is changed.

In accordance with some embodiments, an apparatus may include at least one processor and at least one memory including computer program code. The at least one memory and the computer program code can be configured to, with the at least one processor, cause the apparatus to at least report a first level capability associated with whether at least one measurement gap is needed for the apparatus. The at least one memory and the computer program code can be further configured to, with the at least one processor, cause the apparatus to at least receive at least one pre-configured measurement gap pattern configured by a network node. The at least one memory and the computer program code can be further configured to, with the at least one processor, cause the apparatus to at least determine a second level capability associated with whether at least one measurement gap is needed based on at least one of at least one current physical layer configuration or at least one measurement configuration of the apparatus. The at least one memory and the computer program code can be further configured to, with the at least one processor, cause the apparatus to at least determine when to enable or disable the at least one pre-configured measurement gap pattern based on the second level capability of the apparatus. The at least one memory and the computer program code can be further configured to, with the at least one processor, cause the apparatus to at least inform the network node that at least one status of the at least one pre-configured measurement gap pattern is changed.

In accordance with some embodiments, a non-transitory computer readable medium can be encoded with instructions that may, when executed in hardware, perform a method. The method may include reporting a first level capability associated with whether at least one measurement gap is needed. The method may further include receiving at least one pre-configured measurement gap pattern configured by a network node. The method may further include determining a second level capability associated with whether at least one measurement gap is needed based on at least one of at least one current physical layer configuration or at least one measurement configuration. The method may further include determining when to enable or disable the at least one pre-configured measurement gap pattern based on the second level capability. The method may further include informing the network node that at least one status of the at least one pre-configured measurement gap pattern is changed.

In accordance with some embodiments, a computer program product may perform a method. The method may include reporting a first level capability associated with whether at least one measurement gap is needed. The method may further include receiving at least one pre-configured measurement gap pattern configured by a network node. The method may further include determining a second level capability associated with whether at least one measurement gap is needed based on at least one of at least one current physical layer configuration or at least one measurement configuration. The method may further include determining when to enable or disable the at least one pre-configured measurement gap pattern based on the second level capability. The method may further include informing the network node that at least one status of the at least one pre-configured measurement gap pattern is changed.

In accordance with some embodiments, an apparatus may include circuitry configured to report a first level capability associated with whether at least one measurement gap is needed for the apparatus. The circuitry may further be configured to receive at least one pre-configured measurement gap pattern configured by a network node. The circuitry may further be configured to determine a second level capability associated with whether at least one measurement gap is needed based on at least one of at least one current physical layer configuration or at least one measurement configuration of the apparatus. The circuitry may further be configured to determine when to enable or disable the at least one pre-configured measurement gap pattern based on the second level capability of the apparatus. The circuitry may further be configured to inform the network node that at least one status of the at least one pre-configured measurement gap pattern is changed.

In accordance with some embodiments, a method may include receiving, by a network node, a first level capability associated with whether at least one measurement gap is needed for a user equipment. The method may further include transmitting, by the network node, at least one pre-configured measurement gap pattern, in response to the received first level capability indicates that the user equipment needs a measurement gap. The method may further include receiving, by the network node, at least one status of the at least one pre-configured measurement gap pattern is changed. The method may further include determining, by the network node, to enable or disable the pre-configured measurement gap pattern based on the received changed status.

In accordance with some embodiments, an apparatus may include means for receiving a first level capability associated with whether at least one measurement gap is needed for a user equipment. The apparatus may further include means for transmitting at least one pre-configured measurement gap pattern, in response to the received first level capability indicates that the user equipment needs a measurement gap. The apparatus may further include means for receiving at least one status of the at least one pre-configured measurement gap pattern is changed. The apparatus may further include means for determining to enable or disable the pre-configured measurement gap pattern based on the received changed status.

In accordance with some embodiments, an apparatus may include at least one processor and at least one memory including computer program code. The at least one memory and the computer program code can be configured to, with the at least one processor, cause the apparatus to at least receive a first level capability associated with whether at least one measurement gap is needed for a user equipment. The at least one memory and the computer program code can be further configured to, with the at least one processor, cause the apparatus to at least transmit at least one pre-configured measurement gap pattern, in response to the received first level capability indicates that the user equipment needs a measurement gap. The at least one memory and the computer program code can be further configured to, with the at least one processor, cause the apparatus to at least receive at least one status of the at least one pre-configured measurement gap pattern is changed. The at least one memory and the computer program code can be further configured to, with the at least one processor, cause the apparatus to at least determine to enable or disable the pre-configured measurement gap pattern based on the received changed status.

In accordance with some embodiments, a non-transitory computer readable medium can be encoded with instructions that may, when executed in hardware, perform a method. The method may include receiving a first level capability associated with whether at least one measurement gap is needed for a user equipment. The method may further include transmitting at least one pre-configured measurement gap pattern, in response to the received first level capability indicates that the user equipment needs a measurement gap. The method may further include receiving at least one status of the at least one pre-configured measurement gap pattern is changed. The method may further include determining to enable or disable the pre-configured measurement gap pattern based on the received changed status.

In accordance with some embodiments, a computer program product may perform a method. The method may include receiving a first level capability associated with whether at least one measurement gap is needed for a user equipment. The method may further include transmitting at least one pre-configured measurement gap pattern, in response to the received first level capability indicates that the user equipment needs a measurement gap. The method may further include receiving at least one status of the at least one pre-configured measurement gap pattern is changed. The method may further include determining to enable or disable the pre-configured measurement gap pattern based on the received changed status.

In accordance with some embodiments, an apparatus may include circuitry configured to receive a first level capability associated with whether at least one measurement gap is needed for a user equipment. The circuitry may further be configured to transmit at least one pre-configured measurement gap pattern, in response to the received first level capability indicates that the user equipment needs a measurement gap. The circuitry may further be configured to receive at least one status of the at least one pre-configured measurement gap pattern is changed. The circuitry may further be configured to determine to enable or disable the pre-configured measurement gap pattern based on the received changed status.

BRIEF DESCRIPTION OF THE DRAWINGS

For proper understanding of this disclosure, reference should be made to the accompanying drawings, wherein:

FIG. 3 illustrates an example of a flow diagram of a method that may be performed by a user equipment according to certain embodiments.

FIG. 4 illustrates an example of a flow diagram of a method that may be performed by a network entity according to certain embodiments.

DETAILED DESCRIPTION

Figure 1:
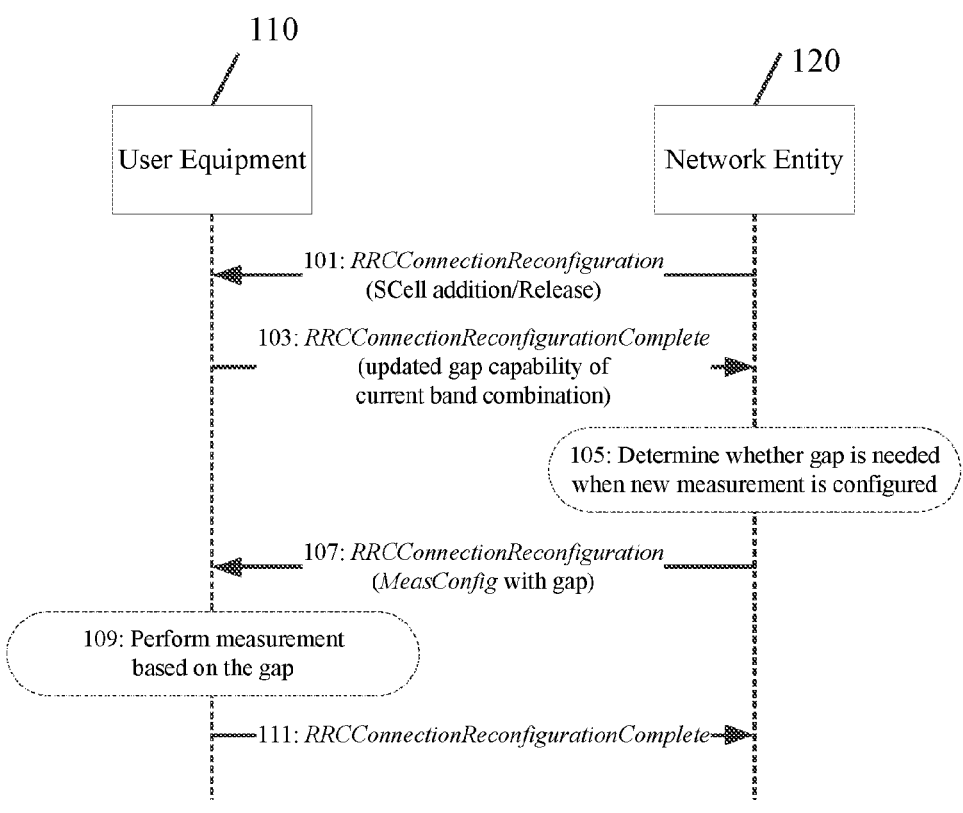
FIG. 1 illustrates an example of a RRC reconfiguration complete message procedure.

Under 3GPP, measurement gap capabilities may be reported in 3 ways. First, with a static approach, as legacy LTE, needForGap signalling may be defined per band combination per supporting band. A second option of a static approach with FR1/FR2 grouping may result in a simplified static approach method, which may be per UE or per BC for FR2 measurement, or per BC for FR1 measurement. Finally, a third dynamic approach option occurs where the UE may report the gap capability corresponding to the current band combination in the RRC reconfiguration complete message, as shown in FIG. 1. In legacy LTE design, NeedForGap signalling may be defined per band combination per supporting band. Whether UEs may perform gapless measurements may depend on the current band combination as well as other L1 parameters that may occupy some baseband resource, such as a number of MIMO layers. In legacy LTE design, UEs may set NeedForGap to TRUE unless the UE may support gapless measurements across other L1 configurations in this band combination.

It would be beneficial for RAN2 to include a NeedForGap signaling method with smaller granularity than band combination compared to legacy LTE rules by considering the L1 parameters configuration that may occupy some baseband resource, such as the number of MIMO layers. Furthermore, to support smaller granularity, the gap capability bits may be increased significantly by considering all possible relevant L1 parameters setting. As a result, static reporting may be impacted, for example, if the UEs support N different numbers of MIMO layers of each band combination, N bits may need to be reported instead of 1 bit to support smaller granularity.

With static approaches discussed above, a UE may report NeedForGap in RRC message UECapabilityInformation at connection setup with the granularity per band combination (BC) per supporting band or per BC/per UE per FR1/FR2 grouping. Since only 1 bit is reported for needForGap capability, the UE may report the need for gaps or gapless measurement assuming any L1 configuration (including worst case) in the concerned BC. In contrast, with the dynamic approach discussed above, the UE reports the gap capability corresponding to the currently configured band combination in the RRCReconfigurationComplete message for configurations affecting UE gap requirements. Since only 1 bit is reported for needForGap capability, the UE should report the need for gaps or gapless measurement assuming any L1 configuration in this BC.

Certain embodiments described herein may improve UE capability signaling. For example, smaller granularity indication is more indicative of future transmissions than legacy LTE methods by addressing drawbacks in an LTE network where almost all UEs need gaps. This may be achieved by supporting smaller granularity indication for a UE's NeedForGap capability based on L1 configuration in use instead of multiple L1 configurations in legacy LTE. In addition, smaller granularities are supported in some embodiments without increasing the gap capability bits. The size may be the same as before, making static reporting approaches still possible. Furthermore, the UE may disable a network pre-configured measurement gap in time via MAC CE or RRC signaling according to its own capability and L1 configurations in use, which may avoid measurement delays for a target frequency in dynamic approaches. Certain embodiments are, therefore, directed to improvements in computer-related technology, specifically, by conserving network resources and reducing power consumption of network entities and/or user equipment located within the network.

Certain embodiments enable a user equipment to control when to enable or disable a pre-configured measurement gap pattern of a network entity, and report the gap pattern usage to the network entity. The network entity may then determine when to schedule data based on the gap pattern usage; specifically, when the gap pattern is used, when gap pattern is not used, when data is scheduled, and when no data is scheduled.

Figure 2:
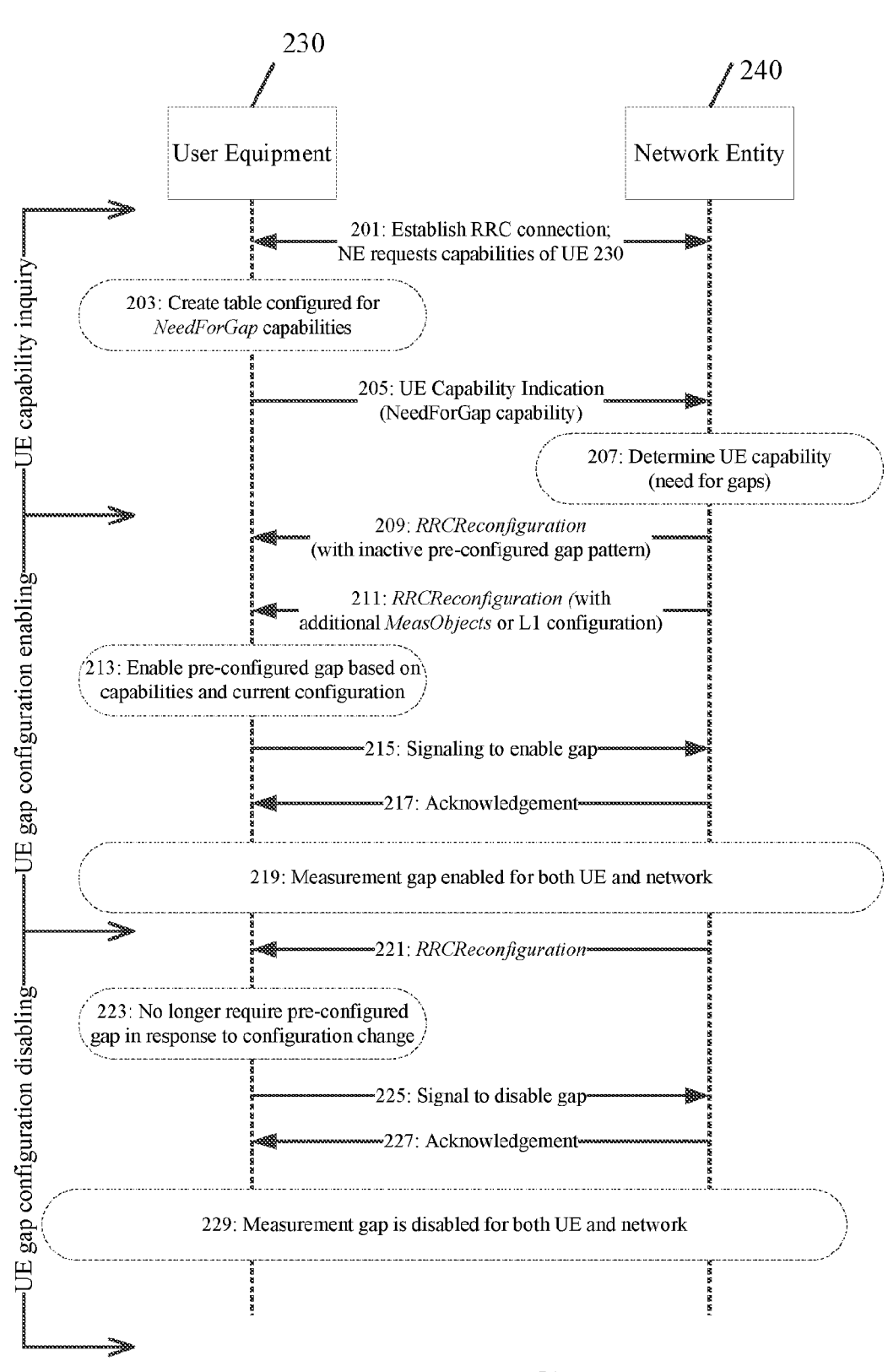
FIG. 2 illustrates an example of a signaling diagram according to certain embodiments.

FIG. 2 illustrates an example of a signalling diagram according to some embodiments. User equipment (UE) 230 may be similar to UE 510, and network entity (NE) 240 may be similar to NE 520, both illustrated in FIG. 5. Although only a single UE and NE are illustrated, a communications network may contain one or more of each of these entities.

In step 201, UE 230 and NE 240 may establish at least one RRC connection. In addition, NE 240 may transmit at least one request to UE 230 of at least one capability of UE 230.

In step 203, UE 230 may create at least one table configured for NeedForGap capabilities, wherein the at least one table is associated with at least one L1 configuration combination configured to provide smaller granularity of UE 230 in NR, which may be configured to indicate at least one gap needed or not needed for at least one layer 1 (L1) parameter configuration. In some embodiments, UE 230 may be associated with at least one NeedForGap capability for each number of MIMO layers or other L1 configuration per band or band combination. For example, 2 MIMO layers in band X may or may not need at least one gap, 4 MIMO layers in band X may not need any gaps, and 8 MIMO layers in band X may or may not need at least one gap; thus, in contrast with an LTE environment, certain embodiments described herein allow for NeedForGap to only be set for per BC per band.

In step 205, UE 230 may report a first level capability associated with whether at least one measurement gap is needed for UE 230. For example, for static approaches, UE 230 may transmit 1 bit NeedForGap in at least one RRC UECapabilityInformation message of granularity per band combination per supporting band and/or per BC/per UE per FR1/FR2 grouping, wherein UE 230 may assume that UE 230 is using a maximum supported L1 resource requirement. The at least one reported NeedForGap capability may be the worst case for the gap requirement for the reported scenario. In various embodiments, the first level capability may be reported according to one or more of at least one granularity per band combination, at least one supporting band, and at least one per band combination/per user equipment, per frequency range 1/frequency range 2 (FR1/FR2) grouping. In some embodiments, the first level capability.is determined based on at least one maximum level of at least one physical layer configuration supported by the user equipment.

In some embodiments, gap capabilities in static and/or dynamic approaches may be reported, wherein the 1 bit NeedForGap capability may be the worst case for the gap requirement by considering UE 230 using the maximum supported L1 resource. In certain embodiments, the first level capability may be determined based on at least one maximum level of at least one physical layer configuration supported by the user equipment, and is carried in one or more of at least one UECapabilityInformation message, at least one RRCConnectionComplete message, and at least one RRCReconfigurationComplete message.

In step 207, NE 340 may determine at least one capability of UE 230, such as at least one need for gaps.

In step 209, NE 240 may transmit at least one pre-configured measurement gap pattern configured to UE 230, for example, at least one RRCReconfiguration message to UE 230. In some embodiments, if the reported needForGap=true, the measurement gap pattern may be pre-configured for UE 230 by NE 240 via at least one RRCReconfiugration message with measurement gap disabled.

In step 211, NE 240 may transmit at least one RRCReconfiguration message to UE 230. In some embodiments, NE 240 may configure at least one MeasurementObject or L1 configuration affecting at least one gap to UE 230.

In some embodiments, if the gap status is enabled by default when the network configures gap pattern to UE, if the reported needForGap=true, measurement gap patterns may be pre-configured to UE 230 by NE 240 via RRCReconfiugration message with measurement gap enabled, and NE 240 may configure MeasurementObject to UE 230 in the same message.

In various embodiments, if the gap status (i.e. enabling or disabling) is indicated by 1 additional bit in the RRC message when network configures gap pattern to UE 230, if the reported needForGap=true, the measurement gap pattern may be pre-configured to UE 230 by NE 240 via RRCReconfiugration message with measurement gap pattern and 1 additional bit for gap status.

In step 213, UE 230 may determine a second level capability associated with whether at least one measurement gap is needed based on at least one of at least one current physical layer configuration or at least one measurement configuration of the user equipment. The second level capability may have smaller granularity than the first level capability. In various embodiments, the second level capability can be determined based on at least one of a number of MIMO layers, at least one set of supported band combinations, and at least one another physical layer configurations within per band combination, at least one supporting band, and at least one per band combination/per user equipment, per frequency range 1/frequency range 2 (FR1/FR2) grouping. For example, UE 230 may enable at least one pre-configured gap based upon at least one capability and at least one current configuration being used by UE 230. For example, UE 230 may enable at least one pre-configured gap based, at least, upon the at least one capability determined in step 203. In addition, UE 230 may determine when to enable or disable the at least one pre-configured measurement gap pattern based on the second level capability of the user equipment. In some embodiments, the at least one physical layer configuration may comprise at least one of a number of MIMO layers, at least one set of supported band combinations, and at least one another physical layer configurations.

In step 215, UE 230 may inform NE 240 that at least one status of the at least one pre-configured measurement gap pattern is changed. For example, UE 230 may enable the at least one gap based upon one or more of its own capability determined in step 203 and/or at least one current MIMO layer in use or other L1 configuration in use. In certain embodiments, the at least one status of the at least one pre-configured measurement gap pattern may be enabled or disabled. Furthermore, the at least one status of the at least one pre-configured measurement gap pattern may be changed comprises being changed either from disabled to enabled, or from enabled to disabled, wherein the change occurs when MeasurementObject configuration or the physical layer configuration for the user equipment changes. Additionally or alternatively, the informing the at least one status of the at least one pre-configured measurement gap pattern may be changed via uplink MAC CE, physical layer command, or RRC signaling.

In some embodiments, as the L1 configuration, such as MIMO layer number, in use is DCI controlled, which may be adjusted according to variable RF conditions, UE 230 may use at least one new uplink MAC CE or RRC indication to inform NE 240 that the gap is disabled, for example, that the measurement gap is not needed in current L1 configurations and band combination.

In certain embodiments, UE 230 may disable the gap based on its own capability in step 203 and current MIMO layers in use (or other L1 configuration in use) and use new uplink MAC CE or RRC indication to inform network the gap is changed.

In various embodiments, UE 230 may indicate the gap based on its own capability in step 203 and current MIMO layers in use (or other L1 configuration in use), then transmit at least one new uplink MAC CE or RRC indication to NE 240 to inform NE 240 the gap status.

In step 217, in response to step 215, NE 240 may transmit at least one acknowledgement to UE 230.

In step 219, UE 230 and/or NE 240 may enable at least one measurement gap. For example, after receiving the indication that the gap is enabled by UE via MAC CE or RRC indication, NW can stop data scheduling to UE during the gap.

In various embodiments, after receiving the indication that the gap is disabled by UE 230 via MAC CE or RRC indication, NE 240 may transmit gapless-scheduling to UE 230.

In step 221, NE 240 may transmit at least one RRCReconfiguration to UE 230.

In step 223, in response to the configuration change, UE 230 may determine that the at least one pre-configured gap is no longer required. In some embodiments, UE 230 may continue with the gap but may experience at least one configuration change, wherein the gap is no longer needed and informs this to NE 240. As a result, UE 230 may disable the gap, and NE 240 to keep scheduling UE 230 without the gap.

In step 225, UE 230 may transmit at least one signal to NE 240 configured to disable the at least one gap.

In step 227, in response to step 225, NE 240 may transmit at least one acknowledgement to UE 230.

In step 229, UE 230 and/or NE 240 may disable the at least one measurement gap.

Figure 5:
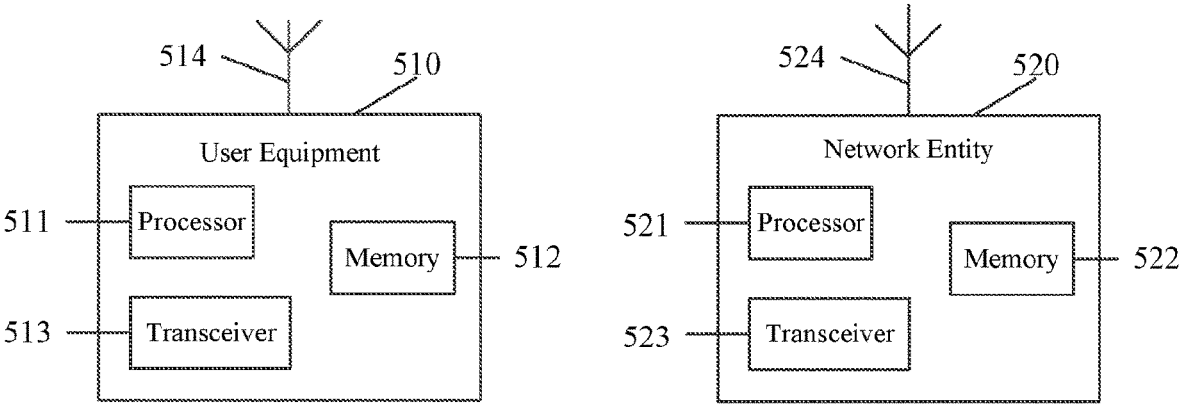
FIG. 5 illustrates an example of a system according to certain embodiments.

FIG. 3 illustrates an example of a method performed by a user equipment, such as UE 510 in FIG. 5. In step 301, the UE may establish at least one RRC connection with at least one NE, such as NE 520 in FIG. 5. In addition, the UE may receive at least one request from the NE of at least one capability of the UE.

In step 303, the UE may create at least one table configured for NeedForGap capabilities, wherein the at least one table is associated with at least one L1 configuration combination configured to provide smaller granularity of the UE in NR, which may be configured to indicate at least one gap needed or not needed for at least one layer 1 (L1) parameter configuration. In some embodiments, the UE may be associated with at least one NeedForGap capability for each number of MIMO layers or other L1 configuration per band or band combination. For example, 2 MIMO layers in band X may or may not need at least one gap, 4 MIMO layers in band X may not need any gaps, and 8 MIMO layers in band X may or may not need at least one gap; thus, in contrast with an LTE environment, certain embodiments described herein allow for NeedForGap to only be set for per BC per band.

In step 305, the UE may report a first level capability associated with whether at least one measurement gap is needed for the UE to the NE. For example, for static approaches, the UE may transmit 1 bit NeedForGap in at least one RRC UECapabilityInformation message of granularity per band combination per supporting band and/or per BC/per UE per FR1/FR2 grouping, wherein the UE may assume that the UE is using a maximum supported L1 resource requirement. The at least one reported NeedForGap capability may be the worst case for the gap requirement for the reported scenario. In various embodiments, the first level capability may be reported according to one or more of at least one granularity per band combination, at least one supporting band, and at least one per band combination/per user equipment, per frequency range 1/frequency range 2 (FR1/FR2) grouping.

In some embodiments, gap capabilities in static and/or dynamic approaches may be reported, wherein the 1 bit NeedForGap capability may be the worst case for the gap requirement by considering the UE using the maximum supported L1 resource. In certain embodiments, the first level capability may be determined based on at least one maximum level of at least one physical layer configuration supported by the user equipment, and is carried in one or more of at least one UECapabilityInformation message, at least one RRCConnectionComplete message, and at least one RRCReconfigurationComplete message.

In step 307, the UE may receive at least one pre-config- ured measurement gap pattern configured, for example, at least one RRCReconfiguration message from the NE. In some embodiments, if the reported needForGap=true, the measurement gap pattern may be pre-configured for the UE by the NE via at least one RRCReconfiugration message with measurement gap disabled.

In step 309, the UE may receive at least one RRCRecon- figuration message from the NE. In some embodiments, the UE may be configured with at least one MeasurementObject or L1 configuration affecting at least one gap by the NE.

In some embodiments, if the gap status is enabled by default when the network configures gap pattern to UE, if the reported needForGap=true, measurement gap patterns may be pre-configured to the UE by the NE via RRCRecon- fiugration message with measurement gap enabled, and the NE may configure MeasurementObject to the UE in the same message.

In various embodiments, if the gap status (i.e. enabling or disabling) is indicated by 1 additional bit in the RRC message when network configures gap pattern to the UE, if the reported needForGap=true, the measurement gap pattern may be pre-configured to the UE by the NE via RRCRecon- fiugration message with measurement gap pattern and 1 additional bit for gap status.

In step 311, the UE may determine a second level capa- bility associated with whether at least one measurement gap is needed based on at least one of at least one current physical layer configuration or at least one measurement configuration of the user equipment, for example, the UE may enable at least one pre-configured gap based upon at least one capability and/or at least one current configuration of the UE. In addition, the UE may determine when to enable or disable the at least one pre-configured measure- ment gap pattern based on the second level capability of the user equipment. In some embodiments, the at least one physical layer configuration may comprise at least one of a number of MIMO layers, at least one set of supported band combinations, and at least one another physical layer con- figurations.

In step 313, the UE may inform the NE that at least one status of the at least one pre-configured measurement gap pattern is changed. For example, the UE may enable the at least one gap based upon one or more of its own capability determined in step 303 and/or at least one current MIMO layer in use or other L1 configuration in use. In certain embodiments, the at least one status of the at least one pre-configured measurement gap pattern may be enabled or disabled. Furthermore, the at least one status of the at least one pre-configured measurement gap pattern may be changed comprises being changed either from disabled to enabled, or from enabled to disabled, wherein the change occurs when MeasurementObject configuration or the physical layer configuration for the user equipment changes. Additionally or alternatively, the informing the at least one status of the at least one pre-configured measurement gap pattern may be changed via uplink MAC CE, physical layer command, or RRC signaling.

In some embodiments, as the L1 configuration, such as MIMO layer number, in use is DCI controlled, which may be adjusted according to variable RF conditions, the UE may use at least one new uplink MAC CE or RRC indication to inform the NE that the gap is disabled, for example, that the measurement gap is not needed in current L1 configurations and band combination.

In certain embodiments, the UE may disable the gap based on its own capability in step 303 and current MIMO layers in use (or other L1 configuration in use) and use new uplink MAC CE or RRC indication to inform network the gap is changed.

In various embodiments, the UE may indicate the gap based on its own capability in step 303 and current MIMO layers in use (or other L1 configuration in use), then transmit at least one new uplink MAC CE or RRC indication to the NE to inform the NE the gap status.

In step 315, the UE may receive at least one acknowl- edgement from the NE. In step 317, the UE may enable at least one measurement gap. For example, after receiving the indication that the gap is enabled by the UE via MAC CE or RRC indication, the NE may stop data scheduling to UE during the gap. In various embodiments, after receiving the indication that the gap is disabled by the UE via MAC CE or RRC indication, the UE may receive gapless-scheduling from the NE.

In step 319, the UE may receive at least one RRCRecon- figuration from the NE. In step 321, in response to the configuration change, the UE may determine that the at least one pre-configured gap is no longer required. In some embodiments, the UE may continue with the gap but may experience at least one configuration change, wherein the gap is no longer needed and informs this to the NE. As a result, the UE may disable the gap, and the NE to keep scheduling the UE without the gap.

In step 323, the UE may transmit at least one signal to the NE configured to disable the at least one gap. In step 325, in response to step 323, the UE may receive at least one acknowledgement from the NE. In step 327, the UE may disable the at least one measurement gap.

FIG. 4 illustrates an example of a method performed by a network entity, such as NE 520 in FIG. 5. In step 401, the NE may establish at least one RRC connection. In addition, the NE may transmit at least one request to a UE, such as UE 510 in FIG. 5, of at least one capability of the UE.

In step 403, the NE may receive a first level capability associated with whether at least one measurement gap is needed from the UE. For example, for static approaches, the NE may receive 1 bit NeedForGap in at least one RRC UECapabilityInformation message of granularity per band combination per supporting band and/or per BC/per UE per FR1/FR2 grouping. The at least one reported NeedForGap capability may be the worst case for the gap requirement for the reported scenario. In various embodiments, the first level capability may be reported according to one or more of at least one granularity per band combination, at least one supporting band, and at least one per band combination/per user equipment, per frequency range 1/frequency range 2 (FR1/FR2) grouping.

In some embodiments, gap capabilities in static and/or dynamic approaches may be reported, wherein the 1 bit NeedForGap capability may be the worst case for the gap requirement by considering the UE using the maximum supported L1 resource. In certain embodiments, the first level capability may be determined based on at least one maximum level of at least one physical layer configuration supported by the user equipment, and is carried in one or more of at least one UECapabilityInformation message, at least one RRCConnectionComplete message, and at least one RRCReconfigurationComplete message.

In step 405, the NE may determine at least one capability of the UE, such as at least one need for gaps.

In step 407, the NE may transmit at least one pre-configured measurement gap pattern configured to the UE, for example, at least one RRCReconfiguration message to the UE. In some embodiments, If the reported needForGap=true, the measurement gap pattern may be pre-configured for the UE by the NE via at least one RRCReconfiugration message with measurement gap disabled.

In step 409, the NE may transmit at least one RRCReconfiguration message to the UE. In some embodiments, the NE may configure at least one MeasurementObject or L1 configuration affecting at least one gap to the UE.

In some embodiments, if the gap status is enabled by default when the network configures gap pattern to the UE, if the reported needForGap=true, measurement gap patterns may be pre-configured to the UE by the NE via RRCReconfiugration message with measurement gap enabled, and the NE may configure MeasurementObject to the UE in the same message.

In various embodiments, if the gap status (i.e. enabling or disabling) is indicated by 1 additional bit in the RRC message when network configures gap pattern to the UE, if the reported needForGap=true, the measurement gap pattern may be pre-configured to the UE 230 by the NE via RRCReconfiugration message with measurement gap pattern and 1 additional bit for gap status.

In step 411, the NE may receive at least one signal of at least one gap from the UE. For example, the NE may enable the UE with at least one gap based upon one or more of its own capability determined and/or at least one current MIMO layer in use or other L1 configuration in use.

In some embodiments, as the L1 configuration, such as MIMO layer number, in use is DCI controlled, which may be adjusted according to variable RF conditions, the UE may use at least one new uplink MAC CE or RRC indication to inform the NE that the gap is disabled, for example, that the measurement gap is not needed in current L1 configurations and band combination.

In certain embodiments, the UE may disable the gap based on its own capability and current MIMO layers in use (or other L1 configuration in use) and use new uplink MAC CE or RRC indication to inform network the gap is changed.

In various embodiments, the UE may indicate the gap based on its own capability and current MIMO layers in use (or other L1 configuration in use), then transmit at least one new uplink MAC CE or RRC indication to the NE to inform the NE the gap status.

In step 413, the NE may transmit at least one acknowledgement to the UE.

In step 415, the NE may enable at least one measurement gap. For example, after receiving the indication that the gap is enabled by UE via MAC CE or RRC indication, NW can stop data scheduling to UE during the gap. In various embodiments, after receiving the indication that the gap is disabled by the UE via MAC CE or RRC indication, the NE may transmit gapless-scheduling to UE 230.

In step 417, the NE may transmit at least one RRCReconfiguration to the UE.

In step 419, the NE may receive at least one signal from the UE configured to disable the at least one gap. In step 421, the NE may transmit at least one acknowledgement to the UE. In step 423, the NE may disable the at least one measurement gap.

FIG. 5 illustrates an example of a system according to certain embodiments. In one embodiment, a system may include multiple devices, such as, for example, user equipment 510 and network entity 520.

UE 510 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 520 may be one or more of a base station, such as an evolved node B (eNB) or next generation node B (gNB), a next generation radio access network (NG RAN), a serving gateway, a server, and/or any other access node or combination thereof.

One or more of these devices may include at least one processor, respectively indicated as 511 and 521. At least one memory may be provided in one or more of devices indicated at 512 and 522. The memory may be fixed or removable. The memory may include computer program instructions or computer code contained therein. Processors 511 and 521 and memory 512 and 522 or a subset thereof, may be configured to provide means corresponding to the various blocks of FIGS. 2-4. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple radio access technologies. Other configurations of these devices, for example, may be provided.

Transceivers 513 and 523 may be a transmitter, a receiver, or both a transmitter and a receiver, or a unit or device that may be configured both for transmission and reception.

Processors 511 and 521 may be embodied by any computational or data processing device, such as a central processing unit (CPU), application specific integrated circuit (ASIC), or comparable device. The processors may be implemented as a single controller, or a plurality of controllers or processors.

Memory 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 2-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 2-4. For example, circuitry may be hardware-only circuit implementations, such as analog and/ or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

3 GPP 3rd Generation Partnership Project
5G 5th Generation Wireless System
BC Band Combination
BS Base Station
CE Control Element
eNB evolved Node B
E-UTRAN Evolved Universal Mobile Telecommunications System Terrestrial Radio Access Network

14

FR Frequency Range
gNB Next Generation Node B
L1 Layer 1
L2 Layer 2
LTE Long Term Evolution
MAC Medium Access Control
MIMO Multiple Input Multiple Output
MME Mobility Management Entity
MO Measurement Object
NAS Non-Access Stratum
NE Network Entity
NR New Radio
NW Network
REL Release
RRC Radio Resource Control
UE User Equipment

What is claimed is:

1. A method, comprising:
reporting, by a user equipment, a first level capability associated with whether at least one measurement gap is needed for the user equipment, wherein the first level capability is reported according to the following: one granularity per band combination, at least one supporting band, and at least one per band combination/per user equipment, per frequency range 1/frequency range 2 (FR1/FR2) grouping;
receiving, by the user equipment, at least one pre-configured measurement gap pattern configured by a network node;
determining, by the user equipment, a second level capability associated with whether at least one measurement gap is needed based on current physical layer configurations and at least one measurement configuration of the user equipment, wherein the current physical layer configurations comprise a number of multiple input multiple output (MIMO) layers in use, at least one set of supported band combinations in use, and at least one another physical layer configuration in use;
determining, by the user equipment, when to enable or disable the at least one pre-configured measurement gap pattern based on the second level capability of the user equipment; and
informing, by the user equipment, the network node that at least one status of the at least one pre-configured measurement gap pattern is changed.

2. The method according to claim 1, wherein the second level capability has smaller granularity than the first level capability.

3. The method according to claim 2, wherein the smaller granularity is supported without increasing gap capability bits, and wherein the first level capability is determined based on at least one maximum level of at least one physical layer configuration supported by the user equipment, and is carried in at least one UECapability Information message, at least one RRCConnectionComplete message, and at least one RRCReconfigurationComplete message.

4. The method according to claim 3, wherein the at least one status of the at least one pre-configured measurement gap pattern is enabled; and wherein the method further comprises:
enabling, by the user equipment, at least one measurement gap;
receiving, from a network entity, at least one RRCReconfiguration message;
based on the received at least one RRCReconfiguration message, determining that the at least one measurement gap is no longer required;

transmitting, by the user equipment, a signal to the network entity to disable the at least one measurement gap;

disabling, by the user equipment, the at least one measurement gap; and receiving, by the user equipment, gapless-scheduling from the network entity.

5. The method according to claim 4, wherein the at least one status of the at least one pre-configured measurement gap pattern comprises at least one explicit indication with one additional bit together with the at least one pre-configured measurement gap pattern.

6. An apparatus, comprising at least one processor and at least one memory including computer program code, wherein the at least one memory and the computer program code are configured to cause, the at least one processor to:

report a first level capability associated with whether at least one measurement gap is needed for a user equipment, wherein the first level capability is reported according to the following: one granularity per band combination, at least one supporting band, and at least one per band combination/per user equipment, per frequency range 1/frequency range 2 (FR1/FR2) grouping;

receive at least one pre-configured measurement gap pattern configured by a network node;

determine a second level capability associated with whether at least one measurement gap is needed based on current physical layer configurations or at least one measurement configuration of the user equipment, wherein the current physical layer configurations comprise a number of multiple input multiple output (MIMO) layers in use, at least one set of supported band combinations in use, and at least one another physical layer configuration in use;

determine when to enable or disable the at least one pre-configured measurement gap pattern based on the second level capability of the user equipment; and inform the network node that at least one status of the at least one pre-configured measurement gap pattern is changed.

7. The apparatus according to claim 6, wherein the second level capability has smaller granularity than the first level capability.

8. The apparatus according to claim 7, wherein the smaller granularity is supported without increasing gap capability bits, and wherein the first level capability is determined based on at least one maximum level of at least one physical layer configuration supported by the user equipment, and is carried in a UECapabilityInformation message, at least one RRCConnectionComplete message, and at least one RRCReconfigurationComplete message.

9. The apparatus according to claim 8, wherein the at least one status of the at least one pre-configured measurement gap pattern is enabled; and wherein the at least one memory and the computer program code are configured to further cause, the at least one processor to:

enable at least one measurement gap;

receive, from a network entity, at least one RRCReconfiguration message;

based on the received RRCReconfiguration message, determine that the at least one measurement gap is no longer required;

transmit a signal to the network entity to disable the at least one measurement gap;

disable the at least one measurement gap; and receiving, by the user equipment, gapless-scheduling from the network entity.

10. The apparatus according to claim 9, wherein the at least one status of the at least one pre-configured measurement gap pattern comprises at least one setting configured to set a disabled status by default with the pre-configured measurement gap pattern being stored, but used once it is enabled.

11. The apparatus according to claim 10, wherein the at least one status of the at least one pre-configured measurement gap pattern comprises at least one explicit indication with one additional bit together with the at least one pre-configured measurement gap pattern.

12. The apparatus according to claim 11, wherein the at least one status of the at least one pre-configured measurement gap pattern being changed when MeasurementObject configuration or the physical layer configuration for the user equipment changes.

13. The apparatus according to claim 12, wherein the informing the at least one status of the at least one pre-configured measurement gap pattern is changed via physical layer command.

14. A system comprising:

an apparatus comprising at least one processor and at least one memory including computer program code, wherein the at least one memory and the computer program code are configured to cause the at least one processor to:

report a first level capability associated with whether at least one measurement gap is needed for a user equipment, wherein the first level capability is reported according to the following: one granularity per band combination, at least one supporting band, and at least one per band combination/per user equipment, per frequency range 1/frequency range 2 (FR1/FR2) grouping;

receive at least one pre-configured measurement gap pattern configured by a network node;

determine a second level capability associated with whether at least one measurement gap is needed based on current physical layer configurations or at least one measurement configuration of the user equipment, wherein the current physical layer configurations comprise a number of multiple input multiple output (MIMO) layers in use, at least one set of supported band combinations in use, and at least one another physical layer configuration in use;

determine when to enable or disable the at least one pre-configured measurement gap pattern based on the second level capability of the user equipment; and inform the network node that at least one status of the at least one pre-configured measurement gap pattern is changed.

15. The system according to claim 14, wherein the second level capability has smaller granularity than the first level capability.

16. The system according to claim 15, wherein the smaller granularity is supported without increasing gap capability bits, and wherein the first level capability is determined based on at least one maximum level of at least one physical layer configuration supported by the user equipment, and is carried in at least one UECapability Information message, at least one RRCConnectionComplete message, and at least one RRCReconfigurationComplete message.

17. The system according to claim 16, wherein the at least one status of the at least one pre-configured measurement gap pattern is enabled; and wherein the at least one memory and the computer program code are configured to further cause the at least one processor to:

enable at least one measurement gap;

receive at least one RRCReconfiguration message;

based on the received at least one RRCReconfiguration message, determine that the at least one measurement gap is no longer required;

transmit a signal to a network entity to disable the at least one measurement gap;

disable the at least one measurement gap; and receive, by the user equipment, gapless-scheduling from the network entity.

18. The system according to claim 17, wherein the at least one status of the at least one pre-configured measurement gap pattern comprises at least one explicit indication by one additional bit together with the preconfigured measurement gap pattern.

19. The system according to claim 14, wherein the at least one status of the at least one pre-configured measurement gap pattern being changed when at least one MeasurementObject configuration for the user equipment changes.

20. The system according to claim 14, wherein the informing the at least one status of the at least one pre-configured measurement gap pattern is changed is via physical layer command.

<div align="center">* * * * *</div>